United States Patent Office 3,660,528
Patented May 2, 1972

3,660,528
UNSATURATED POLYESTER RESINS, METHOD OF THEIR PRODUCTION AND APPLICATION
Alla Elisbarovna Kostenko, Komsomolsky prospekt 8, kv. 56; Valentina Vasilievna Karpukhina, Ulitsa Lishchanskaya 31b, kv. 51; and Valentina Petrovna Tovpyaga, Ulitsa Donetskaya 44a, kv. 33, all of Severodonetsk Luganskoi Oblasti, U.S.S.R.; Gila Naumovich Freidlin, Prospekt Lenina 135, kv. 59; and Ary Artemovich Adamov, Prospekt Leinina 135, kv. 71, both of Tula, U.S.S.R.; and Lidia Fedotovna Berezhnaya, Ulitsa Kalinina 15, kv. 10, Severodonetsk Luganskoi Oblasti, U.S.S.R.
No Drawing. Filed Feb. 12, 1970, Ser. No. 11,005
Int. Cl. C08f 21/00, 43/00
U.S. Cl. 260—861
10 Claims

ABSTRACT OF THE DISCLOSURE

A method of producing unsaturated polyester resins that contain terminal vinyl groups in the polymer chain, that set without additional introduction of a cross-linking monomer, with the formation of polymers featuring high thermostability and mechanical strength; the method residing in condensing polyhydric alcohols with unsaturated acids or anhydrides thereof, or with mixtures of saturated and unsaturated acids or anhydrides thereof, with the introduction directly at the polycondensation stage of at least one divinyl ester of aliphatic dicarboxylic acids of the formula $$CH_2=CHOOC(CH_2)_nCOOCH=CH_2$$

where $n$ ranges from 3 to 8, said resins being used as a basis for preparing various laminated plastics, adhesives, varnishes and compounds.

---

The present invention relates to unsaturated polyester resins, to a method of their production and application.

Known in the art are unsaturated polyester resins produced by reacting dihydric alcohols and dibasic acids, both of the components or one of them being unsaturated. Most widely used in industry are products of the condensation of difunctional alcohols with unsaturated acids, with mixtures of unsaturated and saturated acids, or with anhydrides of such acids.

As alcohols use is made of ethylene, propylene, 1,3-butylene and 2,3-butylene, diethylene, dipropylene, triethylene glycols etc., sometimes polyhydric alcohols being introduced in small quantities, such as glycerol, pentaerythritol, and the like.

Maleic or fumaric acid is most frequently used as the unsaturated dibasic acid.

As unsaturated acids phthalic, m-phthalic, adipic and other acids are used.

Anhydrides of some of the aforesaid acids are used in most cases for the synthesis of unsaturated polyester resins.

The use of unsaturated polyester resins as binding agents, e.g., when producing plastics, varnishes and embedding compounds, is associated with the necessity of dissolving them in monomer compounds which contain double bonds and act not only as solvents, but also as cross-linking agents, copolymerizing with the unsaturated groups of the polyesters.

It is known to use monomers such as vinyl, acrylic and allyl monomers.

Vinyl monomers include styrene, vinyl acetate, α-methyl styrene, divinylbenzene, vinylpyridine, N-vinyl pyrrolidone, etc.

Acrylic monomers include methyl methacrylate, acrylamide, acrylonitrile, n-tert.butylacrylamide.

The most commonly used allyl monomers are diallyl phthalate, diallyl fumarate and triallyl cyanurate.

From among the above-cited monomers styrene is most widely used, due to its being most easily available, cheap and readily copolymerizable with polyester resins. However, styrene has a number of disadvantages, particularly a rather high volatility, which not only involves its losses when processing resins, but also brings about a high concentration of styrene vapours in the zone where resins are processed, thus impairing the sanitary and hygienic working conditions.

Moreover, copolymerization products of styrene and polyester feature low thermal stability, their Vicat thermostability being 80–100° C.

The use of vinyl toluene, methyl methacrylate, methyl styrene and some other monomers whose boiling point is closer to that of styrene, does not materially improve the working conditions when working with these materials and, besides, reduces the longevity of the resin.

Such monomers as diallyl phthalate, triallyl cyanurate, although they have low volatility, are highly viscous and can be employed only in combination with other monomers, predominantly with styrene. Besides, said monomers are expensive.

The object of the present invention is to provide a method of producing unsaturated polyester resins which can be processed without recourse to the introduction of an additional monomer agent or solvent with the formation of polymers featuring high strength and thermal stability.

Said object is accomplished by the provision of unsaturated polyester resins which are the product of the interaction of a polyhydric alcohol, an acid component which is an unsaturated dibasic acid or its mixture with a saturated dibasic acid, or anhydrides of said acids, and of at least one divinyl ester of an aliphatic dicarboxylic acid of the following general formula:

$$CH_2=CHOOC(CH_2)_nCOOCH=CH_2$$

where $n$ ranges from 3 to 10.

These resins are slightly coloured or colourless liquids with a viscosity of 1100 cp. and higher and with a slight characteristic odor.

The present unsaturated polyester resins are produced by a method which, according to the invention, resides in reacting a polyhydric alcohol, an acid agent and at least one divinyl ester of an aliphatic dicarboxylic acid of the general formula:

$$CH_2=CHOOC(CH_2)_nCOOCH=CH_2$$

where $n$ ranges from 3 to 10.

The process is carried out in such a manner that the amount of the alcohol should be not less than 1 mole per mole of the acid component, which is an unsaturated dicarboxylic acid (or its anhydride), or a mixture of an unsaturated acid (anhydride) with a saturated dicarboxylic acid or anhydride thereof. Said divinyl ester is taken in an amount of not less than 0.5 mole per mole of the acid agent.

The process is carried out at a temperature of 80–200° C. over a period sufficient for the formation of a product with a bromine number not less than 20 g. of bromine per 100 g. of the product. The bromine numbers characterize the vinyl unsaturation of the resulting resins and predominantly lie in the range of 30–80 g. of bromine per 100 g. of the product, deviations below or above said limits being admissible, however.

As polyhydric alcohols use can be made of glycols of ethylene, propylene, 1,3- and 2,3-butylene, diethylene and dipropylene, as well as of glycerol, pentaerythritol, etc.

Most often maleic or fumaric acid is used as the unsaturated dibasic acid, though other acids may also be employed, such as itaconic or mesaconic acid.

Saturated acids may be phthalic, m-phthalic, adipic and other acids. The acid component is often represented by anhydrides of some of the aforesaid acids.

For the synthesis of the resins described by us, it is proposed to use as divinyl esters of aliphatic carboxylic acids divinyl glutarate, divinyl adipate, divinyl azelate, divinyl sebacate, etc. Said esters are high-boiling colourless liquids with a slight characteristic odor.

The method proposed herein can be embodied in different ways. The synthesis of polyester resins on the basis of the proposed components can be realized either in the presence of a catalyst or without it. The use of a catalyst contributes to the reduction of the reaction temperature and to diminishing the reaction time. As a catalyst there can be used mineral acids, such as sulfuric or phosphoric, as well as organic sulfonic acids and sulfonyl chlorides (benzenesulfonic acid, p-toluenesulfonyl chloride, etc.). The synthesis can be run under ordinary conditions or in the atmosphere of carbon dioxide, nitrogen, argon and other inert gases.

During the synthesis conventional stabilizers, such as hydroquinone are introduced and adapted for precluding premature gelation of the resin in the course of synthesis and storage.

The process of interaction of the starting components can be effected either by simultaneous introduction thereof, or by first reacting the alcohol with the acid component, and then condensing the resulting products with the divinyl ester of the aliphatic dicarboxylic acid.

It is more expedient to run the synthesis in accordance with the second procedure, which is recommended to be effected as follows.

A polyhydric alcohol taken in an amount of from 1.3 to 2 moles is condensed with 1 mole of an acid component at a temperature of 80–180° C. till the resulting product attains an acid number of 10–80 mg. KOH/g. Depending on the desired acid number, the condensation of the alcohol and acid is carried out over a period of 0.5–5 hours.

Then the obtained products are condensed with a divinyl ester of an aliphatic dicarboxylic acid taken in an amount of 1 to 3 moles per mole of the acid component, depending on the functionality of the alcohol employed in the synthesis. When using a mixture of said esters the molar ratios are kept within the same range. The process is carried out at a temperature not lower than 140° C. over a period of time sufficient for the formation of a product whose bromine number lies within 30–80 g. of bromine per 100 g. of the product.

The reaction rate between divinyl esters of aliphatic dicarboxylic acids or a mixture of these esters with the products of condensation of an alcohol and an acid component depends not only on the initial compounds, reaction temperature and catalyst, but also on the molecular weight of said condensation products, namely, the lower the molecular weight, the easier the trans-esterification process.

The above-described version is preferable for the following reasons. When the process is started by carrying out the reaction between the alcohol and acid component, this results in obtaining comparatively homogeneous predominantly low-molecular weight linear condensation products, which contain mainly terminal hydroxy groups due to the excess alcohol.

When the divinyl ester is introduced after the reaction between the alcohol and acid component has been substantially completed, the divinyl ester resides in the reaction sphere for a considerably shorter period than when the components are introduced simultaneously. This minimizes side reactions which otherwise lead to the loss of both vinyl groups and ensures maximum yield of the polyester containing terminal vinyl groups.

The procedure of producing resins according to the present invention is quite simple, and the process can be carried out in such equipment which is conventionally employed for producing usual polyester resins.

The required alcohol and acid components are easily available.

As to the divinyl esters of aliphatic dicarboxylic acids, the raw materials for their production are aliphatic dicarboxylic acids and vinyl acetate, these products being mass-produced. For the synthesis of the resins proposed herein it is possible to use not only individual divinyl esters, but also their mixture obtained by vinylation of mixtures of dicarboxylic acids. The latter are obtained through oxidation of paraffins, slates, and the like, as well as in the form of by-products of certain chemical processes.

The use of divinyl esters in combination with conventional starting components has made it possible to produce low-viscosity polyester resins which can be processed without additional introduction of a cross-linking monomer or solvent.

Said resins feature a high degree of unsaturation created due to the double bonds present both in the residues of the unsaturated acid and divinyl esters. This provides for the setting of the herein-proposed unsaturated polyester resins at temperatures of 25±5° C. and higher with the formation of three-dimensional polymers that feature high strength and thermal stability. At the same time this does not result in a higher brittleness of the set products, since aliphatic chains of divinyl esters produce a plasticizing effect.

Resins set with initiators feature a Vicat thermostability of 200–300° C., ultimate compression strength of 1500–2500 kg./cm.$^2$ and specific impact strength of 6–8 kgm./cm.$^2$.

The combination of low viscosity of the resins with a high extent of unsaturation thereof which makes possible their processing without additionally introducing a monomer, with the formation of cross-linked products characterized by an increased thermostability is the main advantage offered by the resins proposed by us.

Unsaturated polyester resins produced in accordance with the present invention can be employed instead of the known polyester resins when manufacturing laminated plastics, adhesives, electric insulation and sealing compounds, and the like. But the scope of their application can be considerably extended due to the fact that they do not contain volatile monomers and that the cross-linked products exhibit high thermostability.

For a better understanding of the present invention given hereinbelow are examples illustrating the process of producing the proposed resins and examples illustrating their application as binders for various purposes.

EXAMPLE 1

A four-necked flask equipped with a mechanical stirrer, thermometers for measuring temperature in the cube and vapours, with a condenser for removing low-molecular weight products of condensation and with a tube for feeding an inert gas, is charged with 62 g. (1 mole) of ethylene glycol and 49 g. (0.5 mole) of maleic anhydride.

The condensation is carried out at a temperature of 160–180° C. over a period of 3 hours with the removal of water liberated in the course of condensation.

To the resulting reaction product 99 g. (0.5 mole) of divinyl adipate is added, and the condensation is continued at a temperature of 160–180° C. during 45–60 minutes, the acetaldehyde forming due to trans-esterification being distilled off. 0.1 g. of hydroquinone is introduced simultaneously with divinyl adipate. The synthesis is carried out in the atmosphere of carbon dioxide gas. The resulting resin is a transparent slightly yellow liquid with a viscosity of 1600–2000 cp. The bromine number of the resin is $$40\text{--}50 \frac{\text{g. of Br}}{100 \text{ g. of the product}}$$

The time of gelation of the resin with an initiating system consisting of 3% cumene hydroperoxide and 7% cobalt naphthenate at 100° C. is 5–15 minutes.

EXAMPLE 2

A three-necked flask equipped with a mechanical stirrer, thermometers for measuring temperature in the cube and vapours, and a condenser, is charged with 62 g. (1 mole) of ethylene glycol and 58 g. (0.5 mole) of maleic acid, and the condensation is carried out at a temperature of 140–170° C. over a period of 45–60 minutes while distilling off the liberated water.

To the resulting reaction product there are added 154.2 g. (0.75 mole) of a mixture of divinyl esters (divinyl adipate and divinyl sebacate) and 0.15 g. of hydroquinone.

The condensation is carried out at a temperature of 170–190° C. till the distilling off of acetaldehyde ceases. The resin is a liquid whose colour ranges from light yellow to yellow. The bromine number of the resin is $$50\text{-}70 \ \frac{\text{g. of Br}}{100 \text{ g. of the product}}$$

EXAMPLE 3

In the three-necked flask of Example 2, 62 g. (1 mole) of ethylene glycol are condensed with 49 g. (0.5 mole) of maleic anhydride in the presence of a catalyst which is 30% $H_2SO_4$ taken in an amount of 0.1 g., at a temperature of 120–160° C. till the acid number reaches the value of $$50\text{-}70 \ \frac{\text{mg. KOH}}{\text{g. of the product}}$$

The water liberated in the course of condensation is distilled off. To the resulting reaction product there are added 127 g. (0.5 mole) of divinyl sebacate and 0.127 g. of hydroquinone, and the condensation is continued at a temperature of 150–170° C. till the distilling off of acetaldehyde ceases.

The obtained resin features a bromine number ranging from $$30 \text{ to } 50 \ \frac{\text{g. of Br}}{100 \text{ g. of the product}}$$

EXAMPLE 4

A three-necked flask equipped with a mechanical stirrer, with a thermometer for measuring temperature in the cube and with a reflux condenser is charged with 31 g. (0.5 mole) of ethylene glycol and 49 g. (0.5 mole) of maleic anhydride, and the reaction mixture is heated at a temperature of 80–100° C. for 30 minutes.

To the reaction mixture there are added 99 g. (0.5 mole) of divinyl adipate and 0.1 g. of hydroquinone, the reflux condenser is replaced by a parallel-current one, and the condensation is continued with the acetaldehyde being distilled off, at a temperature of 150–160° C. for 60–90 minutes.

The resulting resin is a slightly coloured liquid. The bromine number of the resin is $$50\text{-}60 \ \frac{\text{g. of Br}}{100 \text{ g. of the product}}$$

The gelation time of the resin with an initiating system consisting of 3% cumene hydroperoxide and 7% cobalt naphthenate at 100° C. is in the range of 6–10 minutes.

EXAMPLE 5

A three-necked flask similar to that described in Example 2 is charged with 27.2 g. (0.2 mole) of pentaerythritol and 9.8 g. (0.1 mole) of maleic anhydride, then 0.038 g. of 40% $H_2SO_4$ is introduced, and the condensation is carried out at a temperature of 170° C. for 2 hours. Water liberated in the course of condensation is distilled off. Then to the reaction product there are poured 59.4 g. (0.3 mole) of divinyl adipate and 0.05 g. of hydroquinone, and the synthesis is continued with distilling off the evolving acetaldehyde at a temperature of 160° C. during 3–4 hours.

The resulting resin is a light yellow liquid.

The bromine number of the resin is $$50\text{-}70 \ \frac{\text{g. of Br}}{100 \text{ g. of the product}}$$

The time of resin gelation with the initiating system consisting of 3% cumene hydroperoxide and 8% cobalt naphthenate at 100° C. amounts to 9–15 minutes.

EXAMPLE 6

A three-necked flask similar to that described in Example 2 is charged with 93 g. (1.5 moles) of ethylene glycol which is condensed with 113.8 g. (0.76 mole) of phthalic anhydride, the temperature being gradually raised to 200° C., till the formation of the product whose acid number is $$30\text{-}40 \ \frac{\text{mg. KOH}}{1 \text{ g. of the prod.}}$$

The condensation is carried out with the liberated water being distilled off. Then 38.6 g. (0.39 mole) of maleic anhydride are introduced, and the condensation is continued under the same temperature conditions till the acid number becomes $$30\text{-}40 \ \frac{\text{mg. KOH}}{1 \text{ g. of the product}}$$

To the obtained product of condensation there are added 148.6 g. (0.75 mole) of divinyl adipate, 0.15 g. of hydroquinone, and the condensation is further effected at a temperature of 150–160° C. for 60 minutes with distilling off the evolving acetaldehyde. The bromine number of the obtained resin is $$60\text{-}80 \ \frac{\text{g. of Br}}{100 \text{ g. of the product}}$$

The time of resin gelation with an initiating system consisting of 0.3% cumene hydroperoxide and 0.2% vanadium accelerator at 80° C. amounts to about 2 minutes.

The use of said resins as binding agents in the manufacture of laminated plastics imparts an enhanced thermostability thereto as compared to conventional polyester resins, as well as adequately high strength characteristics. The employment of the resins of the present invention as binding agents for adhesives and electrical-insulating compounds also ensures good strength and dielectric characteristics to articles made on their basis, as can be seen from the following examples.

EXAMPLE 7

A glass-reinforced plastic is produced by contact moulding, with the use of the polyester resin prepared as described in Example 1 as a binder, glass fabric serving as a filler. The binder and the filler are taken in a weight ratio of 40:60.

The characteristics of the glass-reinforced plastic thus produced are as follows:

| | |
|---|---|
| Martens temperature, ° C. | 250–260 |
| Tensile strength, kg./cm.$^2$ | 3600–4000 |
| Bending strength, kg./cm.$^2$ | 2800–3000 |
| Brinell hardness, kg./mm.$^2$ | 18–22 |
| Specific impact viscosity, kgm./cm.$^2$ | 350–370 |

EXAMPLE 8

A glass-reinforced plastic is produced by contact moulding, the resin produced as described in Example 5 being used as a binder and glass fabric as a filler, the weight ratio therebetween being 40:60. The initiating system consists of 2% cumene hydroperoxide and 8% cobalt naphthenate, the polymerization proceeding at a temperature of 80° C. over a period of 3–4 hours.

The properties of the glass-reinforced plastic thus produced are as follows:

Martens temperature, ° C. _____ 230–300
Bending strength, kg./cm.² _____ 2600–2800

EXAMPLE 9

The resin produced as described in Example 1 is used for preparing adhesives.

The heat-setting adhesive composition comprises the following ingredients (in parts by weight):

Resin _____ 100
Cumene hydroperoxide _____ 3
Cobalt naphthenate _____ 7
Talc _____ 50

Setting conditions:

Temperature, ° C. _____ 70–80
Time, hrs. _____ 3–4

Depending on the kind of surfaces to be cemented, the strength characteristics are as follows:

metal-metal: tearing strength—70–80.0 kg./cm.²
glass-reinforced plastic—glass-reinforced plastic:
  tearing strength—36–40 kg./cm.²
  shear strength—45–50 kg./cm.²
metal-wood: shear strength—60 kg./cm.²

EXAMPLE 10

The resin produced as described in Example 1 is used for preparing cold-setting adhesives.

The cold-setting adhesive composition comprises the following ingredients (in parts by weight):

Resin _____ 100
Cumene hydroperoxide _____ 0.2
Vanadium accelerator _____ 0.3
Talc _____ 50

Setting conditions:

Temperature, ° C. _____ 25±5
Time, days _____ 3

The shear strength of two glass-reinforced plastics cemented with the help of said adhesive composition is 45–50 kg./cm.².

EXAMPLE 11

40 parts by weight of the resin produced as described in Example 1 are combined with 160 parts by weight of quartz sand, then 3 parts by weight of cumene hydroperoxide and 3 parts by weight of cobalt naphthenate are introduced thereinto, the mixture is thoroughly stirred and allowed to set at a temperature of 100° C. during 1.5–2 hours. The compound obtained in accordance with the above-specified formulation features the following characteristics:

Surface resistance, ohms _____ $1.7 \cdot 10^{13}$–$1.4 \cdot 10^{14}$
Volume resistance, ohms _____ $7.1 \cdot 10^{13}$–$1.4 \cdot 10^{14}$
Electric strength, kV/mm. _____ 17–25

EXAMPLE 12

Furniture varnish with the use of the resin produced as described in Example 1 was prepared according to the following formulation:

G.
Resin of Example 1 _____ 70
Polyester-acrylate resin _____ 70
Collodion cotton _____ 59
Alkyd resin _____ 2.84
Cumene hydroperoxide _____ 6.06
Cobalt naphthenate _____ 9.8

The varnish was applied directly onto the wooden surface without any primer by pouring. The drying time of the varnish at a temperature of 80° C. was 2 hours.

What is claimed is:

1. Low viscosity unsaturated polyester resins setting in the presence of a peroxide catalyst to form an infusible and insoluble polymer having enhanced thermostability, said resins being prepared by
  (1) condensing a polyhydric alcohol with an acid component selected from the group consisting of
    (a) unsaturated dibasic acids
    (b) anhydrides of (a)
    (c) a mixture of saturated and unsaturated dibasic acids and
    (d) anhydrides of (c) and
  (2) transesterifying said condensation product with at least one divinyl ester of an aliphatic dicarboxylic acid of the formula
    $CH_2\!\!=\!\!CHOOC(CH_2)_nCOOCH\!\!=\!\!CH_2$
  where $n$ is a number from 3 to 10.

2. A method of producing the unsaturated polyester resins of claim 1 wherein 1 mole of the polyhydric alcohol is condensed with 1 mole of the acid component and the condensation product is simultaneously transesterified with not less than 0.5 mole of the divinyl ester at a temperature of from 80 to 200° C. over a period of time sufficient to form a product whose bromine number is not less than 20 g. of Br per 100 g. of the product.

3. A method of producing the unsaturated polyester resins of claim 1 wherein 1.3 to 2 moles of the polyhydric alcohol are first condensed with one mole of the acid component at a temperature of from 80–180° C. until the condensation product has an acid number of from 10 to 80 mg. KOH/g. of the product and then the product is transesterified with from 1 to 3 moles of the divinyl ester at a temperature above 140° C. over a period of time sufficient to form a product whose bromine number is from 30 to 80 g. of Br per 100 g. of the product.

4. A method as in claim 2 wherein the divinyl ester is divinyl adipate.

5. A method as in claim 2 wherein the divinyl ester is a mixture of divinyl adipate and divinyl sebacate.

6. A method as in claim 3 wherein the divinyl ester is divinyl adipate.

7. A method as in claim 3 wherein the divinyl ester is a mixture of divinyl adipate and divinyl sebacate.

8. A thermosetting composition comprising the resin of claim 1 and an initiator consisting essentially of a mixture of cumene hydroperoxide and cobalt naphthenate.

9. A method of producing a thermosetting plastic which comprises heating the composition of claim 8 at a temperature of from 70 to 100° C.

References Cited

UNITED STATES PATENTS 2,843,556  7/1958  Moorman _____ 260—28.5
3,455,801  7/1969  D'Alelio _____ 204—159.19

OTHER REFERENCES

Resz et al., Chem. Abstr. 65, 9108e (1966).
Karpukhina et al., Chem. Abstracts 67, 82618c (1967).

WILLIAM H. SHORT, Primary Examiner

E. A. NIELSEN, Assistant Examiner

U.S. Cl. X.R.

117—126 GB; 156—242, 332; 161—170, 195; 260—40 R, 75 UA, 863